United States Patent
Ghoshal et al.

(10) Patent No.: US 10,290,264 B2
(45) Date of Patent: May 14, 2019

(54) METHOD FOR CALIBRATING A COLOR SPACE TRANSFORMATION, METHOD FOR COLOR SPACE TRANSFORMATION AND COLOR CONTROL SYSTEM

(71) Applicant: ams AG, Unterpremstaetten (AT)

(72) Inventors: Sajol Christopher Ghoshal, Austin, TX (US); Sina Afshari, New York, NY (US)

(73) Assignee: ams AG, Unterpremstaetten (AT)

( * ) Notice: Subject to any disclaimer, the term of this patent is extended or adjusted under 35 U.S.C. 154(b) by 179 days.

(21) Appl. No.: 15/309,777

(22) PCT Filed: Apr. 22, 2015

(86) PCT No.: PCT/EP2015/058719
§ 371 (c)(1),
(2) Date: Nov. 8, 2016

(87) PCT Pub. No.: WO2015/169599
PCT Pub. Date: Nov. 12, 2015

(65) Prior Publication Data
US 2017/0162130 A1 Jun. 8, 2017

Related U.S. Application Data (60) Provisional application No. 61/991,321, filed on May 9, 2014.

(30) Foreign Application Priority Data

Jun. 12, 2014 (EP) ..................................... 14172195

(51) Int. Cl.
*G09G 3/34* (2006.01)
*G09G 5/02* (2006.01)
(Continued)

(52) U.S. Cl.
CPC ............. *G09G 3/3413* (2013.01); *G06T 7/90* (2017.01); *G09G 3/342* (2013.01); *G09G 3/3426* (2013.01);
(Continued)

(58) Field of Classification Search
CPC combination set(s) only.
See application file for complete search history.

(56) References Cited

U.S. PATENT DOCUMENTS

| 5,923,316 | A | 7/1999 | Kitamura et al. |
| 2009/0015526 | A1 | 1/2009 | Ramanath et al. |

(Continued)

FOREIGN PATENT DOCUMENTS

| EP | 1271465 A2 | 1/2003 |
| EP | 1701554 A1 | 9/2006 |

(Continued)

OTHER PUBLICATIONS

Hung, Po-Chieh, "Colorimetric calibration for scanners and media," Proc. SPIE 1448, Camera and Input Scanner Systems, pp. 164-174 (Jun. 1, 1991).

*Primary Examiner* — Wesner Sajous
(74) *Attorney, Agent, or Firm* — Fish & Richardson P.C.

(57) ABSTRACT

A method for calibrating a color space transformation according comprises driving of a light source at a first ambient temperature T1. The light source it is tuned to emit light with a number N of combinations of at least two correlated color temperatures and at least two intensities. Furthermore, the method includes receiving first red coordinates, first green coordinates and first blue coordinates measurements in the RGB color space. First x-coordinates, first y-coordinates and first z-coordinates are received from measurements in the XYZ color space. 3×N matrices RGB_1 and XYZ_1 are constructed based on the received
(Continued)

coordinates. A 3×3 conversion matrix C is generated to fulfil the relation XYZ_1=C*RGB_1.

21 Claims, 2 Drawing Sheets

(51) Int. Cl.
G09G 5/10 (2006.01)
G06T 7/90 (2017.01)
H05B 33/08 (2006.01)
F21Y 115/10 (2016.01)
F21Y 113/13 (2016.01)

(52) U.S. Cl.
CPC .............. *G09G 5/02* (2013.01); *G09G 5/026* (2013.01); *G09G 5/10* (2013.01); *H05B 33/086* (2013.01); *H05B 33/0869* (2013.01); *H05B 33/0872* (2013.01); *F21Y 2113/13* (2016.08); *F21Y 2115/10* (2016.08); *G09G 2320/00* (2013.01); *G09G 2320/041* (2013.01); *G09G 2320/064* (2013.01); *G09G 2320/0693* (2013.01); *G09G 2340/06* (2013.01); *G09G 2380/10* (2013.01); *Y02B 20/341* (2013.01)

(56) References Cited

U.S. PATENT DOCUMENTS

| 2009/0046453 | A1 | 2/2009 | Kramer | |
| 2009/0302781 | A1 | 12/2009 | Peker et al. | |
| 2010/0188418 | A1 | 7/2010 | Sakai et al. | |
| 2011/0069094 | A1* | 3/2011 | Knapp | G09G 3/2003 345/690 |
| 2013/0082622 | A1* | 4/2013 | Tien | H05B 33/086 315/297 |
| 2013/0093361 | A1* | 4/2013 | Bertram | H05B 33/0863 315/312 |
| 2013/0120678 | A1* | 5/2013 | Chao | G02F 1/01 349/34 |
| 2013/0300305 | A1* | 11/2013 | Wray | H05B 33/0818 315/210 |
| 2014/0035472 | A1* | 2/2014 | Raj | H05B 33/0863 315/185 R |

FOREIGN PATENT DOCUMENTS

| EP | 2541539 A1 | 1/2013 |
| KR | 20130043340 A | 4/2013 |
| WO | 2008056321 A1 | 5/2008 |

* cited by examiner

FIG 1 calibration mode   productive mode

METHOD FOR CALIBRATING A COLOR SPACE TRANSFORMATION, METHOD FOR COLOR SPACE TRANSFORMATION AND COLOR CONTROL SYSTEM

BACKGROUND OF THE INVENTION

The present disclosure relates to a method for calibrating a color space transformation, a method for color space transformation and a color control system for a light source.

Color-tunable light sources have become popular in various lighting applications. In particular, implementations using light-emitting diodes, LED, based light sources offer a whole range of possible features for lighting applications. Such color-tuneable light sources are, for example, used in ambient lighting applications or backlighting applications for dashboards in automotive products. Another application is color-tuneable backlights for displays. In the field of general lighting applications particularly white tuneable light sources play a major role. LED-based solutions allow for a tuning of the white point, in particular by adjusting the correlated color temperature of the emitted light. In general, such lighting applications feature high requirements on color accuracy and maintenance. For example, luminary to luminary matching is necessary in order to prevent the human eye from perceiving the color of light from different luminaires differently. In particular, with respect to changing ambient temperatures, different light intensities and in view of the long lifetime of LED-based light sources color accuracy and maintenance may be crucial.

In this context, commonly color space transformations, in particular from an RGB color space to an XYZ color space, are involved when measuring or controlling color deviations or differences. On the one hand this is due to the fact that the measurement of color coordinates is technically favourable in an RGB color space, for example the CIE 1931 RGB color space. However, for applications where the perception of an observer is of relevance, expressing color differences makes most sense in a color space adjusted to the biological principles of human color reception, such as an XYZ color space, for example the standard observer CIE 1931 XYZ color space.

SUMMARY OF THE INVENTION

The present disclosure provides an improved concept for accurate color space transformation and color control, especially involving different temperatures, intensities and correlated color temperatures.

A method for color space transformation according to the improved concept consists of a calibration mode of operation comprising a method for calibrating a color space transformation according to the improved concept and a productive mode of operation. One key aspect of the calibration mode is the generation of a conversion matrix that transforms a vector of color coordinates in an RGB color space, for example the CIE 1931 RGB color space, to a vector in an XYZ color space, for example the standard observer CIE 1931 XYZ color space. The improved concept comprises on the one hand the generation of a more accurate conversion matrix and on the other hand the generation of correction terms accounting for different temperatures and correlated color temperatures.

A method for calibrating a color space transformation according to the improved concept comprises the driving of a light source, for example an LED based light source, in particular a color-tuneable light source, at a first ambient temperature T1. Preferably T1 is close to room temperature. While the light source is driven at the first ambient temperature T1, it is tuned to successively emit light with different correlated color temperatures and different intensities. In particular, the light source is tuned to successively emit light with a number N of combinations of at least two correlated color temperatures $CCT\_1, CCT\_2, \ldots, CCT\_Nc$ and at least two intensities $I\_1, I\_2, \ldots, I\_Ni$. Herein Nc denotes the total number of correlated color temperatures and Ni denotes the total number of intensities used.

Furthermore, the method includes receiving, for each of the N combinations of correlated color temperature and intensity, first red coordinates $R\_1, R\_2, \ldots, R\_N$, first green coordinates $G\_1, G\_2, \ldots, G\_N$ and first blue coordinates $B\_1, B\_2, \ldots, B\_N$. These stem from measurements in an RGB color space, for example in the CIE 1931 RGB color space. In addition first x-coordinates $X\_1, X\_2, \ldots, X\_N$ first y-coordinates $Y\_1, Y\_2, \ldots, Y\_N$, and first z-coordinates $Z\_1, Z\_2, \ldots, Z\_N$ are received from measurements in an XYZ color space, for example in the standard observer CIE 1931 XYZ color space. Then, from the first red, the first green and the first blue coordinates a 3×N matrix $RGB\_1$ is constructed according to the formula:

$$RGB\_1 = \begin{bmatrix} R\_1 & R\_2 & \ldots & R\_N \\ G\_1 & G\_2 & \ldots & G\_N \\ B\_1 & B\_2 & \ldots & B\_N \end{bmatrix}. \quad (1)$$

Analogously a 3×N matrix $XYZ\_1$ is constructed from the first x-, the first y- and the first z-coordinates according to the formula:

$$XYZ\_1 = \begin{bmatrix} X\_1 & X1\_2 & \ldots & X\_N \\ Y\_1 & Y1\_2 & \ldots & Y\_N \\ Z\_1 & Z1\_2 & \ldots & Z\_N \end{bmatrix}. \quad (2)$$

Finally, a 3×3 conversion matrix C is generated such that it fulfils the relation:

$$XYZ\_1 = C * RGB\_1. \quad (3)$$

In one embodiment the conversion matrix C is generated according to the method of least square optimization that means the matrix C is obtained according to the formula:

$$C = XYZ\_1 * (RGB\_1)^T * (RGB\_1 * (RGB\_1)^T)^{-1}. \quad (4)$$

In alternative embodiments, the conversion matrix C is for example determined according to another optimization method like a generalized mean square method or a least mean square method.

In the various embodiments the at least two correlated color temperatures $CCT\_1, CCT\_2, \ldots, CCT\_Nc$ may be achieved by driving a first and a second light element emitting light with different correlated color temperatures. The first light element may for example be driven using pulse width modulation, PWM, with a first duty cycle and the second light element may be driven using PWM with a second duty cycle. In this way various correlated color temperatures of the light source may be achieved.

For example, driving the first light element with a first duty cycle of 25% at a correlated color temperature of 3000K and the second light element with a second duty cycle of 75% at a correlated color temperature of 6000K, a resulting correlated color temperature temperatures of the light source may be given by 0.25*3000K+ 0.75*6000K=5250K. Naturally different duty cycles and/or different correlated color temperatures of the first and second light element, respectively, may be used to achieve a different correlated color temperature of the light source. Alternatively also more than two light elements, for example three or four light elements, may be used according to this principle. This may for example allow for a better control of the correlated color temperature of the light source.

In the embodiments for a method for calibrating a color space transformation according to the improved concept, the total numbers of correlated color temperatures Nc and intensities Ni may, for example, affect the accuracy of calculations, transformations or estimations performed based on the conversion matrix C. In particular, such calculations may become more accurate as the numbers Nc and Ni become larger. In principle all methods described here and hereafter work with Nc≥2 and Ni≥1. In particular Nc=2 and/or Ni=1 are possible choices. However, in such case the accuracy of subsequent calculations involving the conversion matrix C may be low, in particular too low to fulfil requirements of the field of general lighting applications.

The measurements in an RGB color space mentioned above and hereafter are for example performed by an RGB light sensor, in particular by a semiconductor based RGB light sensor. The measurements in an XYZ color space mentioned above and hereafter are for example performed by a light meter. Preferably the light meter is also capable of measuring correlated color temperatures of light emitted by the light source.

In a particular embodiment the lowest value and the highest value of the at least two correlated color temperatures may represent the operating range of the tuneable light source. In such embodiment CCT_1 and CCT_Nc for example correspond to the lower and the upper end of the operating range of the light source concerning correlated color temperature, respectively. In some embodiments Nc is larger than 2, for example Nc may be 3, 5 or larger. In an embodiment with Nc=5, CCT_1 and CCT_5=CCT_Nc correspond for example to the lower and the upper end of the operating range of the light source regarding correlated color temperature, respectively. Then CCT_2, CCT_3 and CCT_4 are for example distributed within the operating range, for example specified by CCT_1 and CCT_Nc.

In some embodiments the number Ni of intensities used is larger than 2. In such embodiments I_1 may for example be the one of the at least two intensities with the lowest value. For example I_1 may be 0. Alternatively I_1 may be equal or close to a minimum value for which stable emission of light can be achieved, for example 1%, 10% or 25% of the specified maximum intensity for the light source. I_Nc may for example correspond to the maximum intensity specified for the light source. For example, Nc may be equal to 4. In such embodiment the used intensities I_1, I_2, I_3, I_4=I_Nc for example correspond to 25%, 50%, 75% and 100% of the specified maximum intensity for the light source, respectively.

In some embodiments the N combinations of correlated color temperature and intensity correspond to all possible combinations of correlated color temperature and intensity. Then the total number of combinations is given by N=Nc*Ni. In such embodiments the matrices RGB_1 and XYZ_1 can become rather large, for example they become 3×20 matrices in a the particular embodiment with Nc=5 and Ni=4, while C is always a 3×3 matrix.

The improved concept defines a method for color space transformation comprising a calibration mode of operation and a productive mode of operation. The calibration mode of operation comprises a method for calibrating a color space transformation according to one of the above-described methods. In particular, the calibration mode of operation comprises all steps of such method for calibrating a color space transformation according to one of the above-described methods.

The productive mode of operation comprises the driving of a light source to emit light at a productive ambient temperature T. While the light source is driven a productive red coordinate R, a productive green coordinate G and a productive blue coordinate B are received from measurements performed in the RGB color space. Based on the productive coordinates an estimated x-coordinate Xe, an estimated y-coordinate Ye and an estimated z-coordinate Ze are generated using the conversion matrix C defined by equation (3) or equation (4) according to the formula:

$$\begin{bmatrix} Xe \\ Ye \\ Ze \end{bmatrix} = C * \begin{bmatrix} R \\ G \\ B \end{bmatrix}. \tag{5}$$

According to one embodiment of a method for color space transformation the productive mode of operation further comprises generating a productive x-coordinate X, a productive y-coordinate Y and a productive z-coordinate Z according to the formulae:

$$X = Xe + Mx*(T-T1), \tag{6a}$$

$$Y = Ye + My*(T-T1) \text{ and} \tag{6b}$$

$$Z = Ze + Mz*(T-T1). \tag{6c}$$

Herein Mx, My and Mz are scalar coefficients. In particular, the scalar coefficients may depend on features of the emitted light, as for example a correlated color temperature of the emitted light or an estimated correlated color temperature of the emitted light, or on ambient conditions like an ambient temperature or other ambient conditions.

In some embodiments of the method the scalar coefficients do not depend on the productive ambient temperature T. That means that in such embodiment the scalar coefficients represent weighting factors of linear temperature corrections to the estimated x-coordinate, the estimated y-coordinate and the estimated z-coordinate, as can be seen from expressions (6a)-(6c). Equation (5) can be interpreted as a specific case where X=Xe, Y=Ye and Z=Ze, or in other words Mx=My=Mz=0.

In an embodiment of the method the calibration mode of operation further comprises a driving of the light source at a second ambient temperature T2. Preferably T2 is larger than T1. While driven at the second ambient temperature T2, the light source is tuned to emit light with a warm correlated color temperature CCTw. Then, a warm red coordinate R_w, a warm green coordinate G_w and a warm blue coordinate B_w are obtained from measurements in the RGB color space. Furthermore, a warm x-coordinate X_w, a warm y-coordinate Y_w and a warm z-coordinate Z_w are received from measurements in the XYZ color space. Based on the received warm red, warm green and warm blue coordinates an estimated warm x-coordinate Xe_w, an estimated warm y-coordinate Ye_w and an estimated warm z-coordinate Ze_w are generated according to the formula:

$$\begin{bmatrix} Xe\_w \\ Ye\_w \\ Ze\_w \end{bmatrix} = C * \begin{bmatrix} R\_w \\ G\_w \\ B\_w \end{bmatrix}. \quad (7)$$

In such embodiment the productive mode of operation further comprises generation of the scalar coefficients occurring in (6a)-(6c) according to the expressions $$Mx=(X\_w-Xe\_w)/(T2-T1), \quad (8a)$$

$$My=(Y\_w-Ye\_w)/(T2-T1) \text{ and} \quad (8b)$$

$$Mz=(Z\_w-Ze\_w)/(T2-T1). \quad (8c)$$

According to another embodiment of the method for color space transformation, in particular one embodiment, the calibration mode of operation further comprises driving the light source at a second ambient temperature T2 and, while doing so, tuning the light source to emit light with a warm correlated color temperature CCTw. Then, a warm red coordinate R_w, a warm green coordinate G_w and a warm blue coordinate B_w are received from measurements in the RGB color space. Analogously, a warm x-coordinate X_w, a warm y-coordinate Y_w and a second z-coordinate Z_w are received from measurements in the XYZ color space. Afterwards the light source is tuned to emit light with a cold correlated color temperature CCTc. Then, a cold red coordinate R_c, a cold green coordinate G_c and a cold blue coordinate B_c are received from measurements in the RGB color space. Furthermore, a cold x-coordinate X_c, a cold y-coordinate Y_c and a cold z-coordinate Z_c are received from measurements in the XYZ color space.

Based on the received color coordinates an estimated warm x-coordinate Xe_w, an estimated warm y-coordinate Ye_w, an estimated warm z-coordinate Ze_w as well as an estimated cold x-coordinate Xe_c, an estimated cold y-coordinate Ye_c and an estimated cold z-coordinate Ze_c are generated according to the formulae (7) and:

$$\begin{bmatrix} Xe\_c \\ Ye\_c \\ Ze\_c \end{bmatrix} = C * \begin{bmatrix} R\_c \\ G\_c \\ B\_c \end{bmatrix}, \quad (9)$$

respectively.

On the other hand, in such embodiment the productive mode of operation further comprises the computation of an estimated correlated color temperature CCTe on the basis of the estimated color coordinates Xe, Ye and Ze. Finally, the scalar coefficients occurring in (6a)-(6c) are generated according to the expressions:

$$Mx = \frac{X\_w - Xe\_w}{T2 - T1} + \frac{X\_c - Xe\_c - X\_w + Xe\_w}{T2 - T1} \frac{CCTe - CCTw}{CCTc - CCTw}, \quad (10a)$$

$$My = \frac{Y\_w - Ye\_w}{T2 - T1} + \frac{Y\_c - Ye\_c - Y\_w + Ye\_w}{T2 - T1} \frac{CCTe - CCTw}{CCTc - CCTw}, \quad (10b)$$

$$Mz = \frac{Z\_w - Ze\_w}{T2 - T1} + \frac{Z\_c - Ze\_c - Z\_w + Ze\_w}{T2 - T1} \frac{CCTe - CCTw}{CCTc - CCTw}. \quad (10c)$$

In some embodiments, the driving of the light source at the first and/or the second ambient comprises a control of the respective ambient temperature. In such embodiments the driving of a light source at the productive ambient temperature during the productive mode of operation does not necessarily correspond to a control of the ambient temperature. For example, the value of the productive ambient temperature T may be externally determined as part of a general set of ambient conditions under which the light source is intended to be driven. In such cases, the method comprises receiving the productive temperature.

In the various embodiments of the methods for calibrating a color space transformation and for color space transformation, the computation of the estimated color temperature is performed based on an approach well-known in the art. Technically speaking in such approach for example the closest distance of a color point defined by Xe, Ye and Ze to the Planckian locus is determined or estimated. The Planckian locus represents the color of an incandescent black body as a function of its temperature.

According to the improved concept, a color control system for a light source can be specified. A color control system according to the improved concept comprises a processing unit with a control interface. The processing unit is configured to be coupled to a light source via the control interface. Furthermore, the processing unit is configured to operate in a calibration mode and in a productive mode of operation.

When operating in the calibration mode the processing unit is further configured to control a correlated color temperature of light that is emitted by the light source by generating a color signal at the control interface. Also, the processing unit is configured to control an intensity of light emitted by the light source by generating an intensity signal at the control interface. In particular the processing unit is configured to control the light source to successively emit light with a number N of combinations of at least two correlated color temperatures CCT_1, CCT_2, . . . , CCT_Nc and at least two intensities I_1, I_2, . . . , I_Ni. Herein Nc is the number of correlated color temperatures used and Ni is the number of intensities used. Further, the processing unit is configured to drive the light source at a first ambient temperature T1 and receive the first ambient temperature T1. The first ambient temperature T1 is measured at a position of the light source, in particular at a position being representative for the whole light source concerning ambient temperature.

The processing unit is further configured to receive for each of the N combinations of correlated color temperature and intensity first red coordinates R_1, R_2, . . . , R_N, first green coordinates G_1, G_2, . . . , G_N and first blue coordinates B_1, B_2, . . . , B_N from measurements in an RGB color space, for example in the CIE 1931 RGB color space. The processing unit is also configured to receive first x-coordinates X_1, X_2, . . . , X_N, first y-coordinates Y_1, Y_2, . . . , Y_N and first z-coordinates Z_1, Z_2, . . . , Z_N from measurements in an XYZ color space, for example in the standard observer CIE 1931 XYZ color space. In particular the measurements correspond to light being emitted by the light source while the ambient temperature at the light source is driven at the first ambient temperature T1.

The processing unit is configured to generate a 3×N matrix RGB_1 from the received coordinates measured in the RGB color space and a 3×N matrix XYZ_1 from the received coordinates measured in the XYZ color space, according to the formulae (1) and (2), respectively. The processing unit is further configured to generate a 3×3 conversion matrix C such that it fulfils the relation (3), based on the 3×N matrixes RGB_1 and XYZ_1. Preferably, the conversion matrix C is generated according to the formula (4).

When operating in the productive mode of operation the processing unit is configured to receive a productive red coordinate R, a productive green coordinate G and a productive blue coordinate B from measurements in the RGB color space. These measurements are performed at a productive ambient temperature T, and the value of T is received by the processing unit. Further, the processing unit is configured to compute an estimated x-coordinate Xe, an estimated y-coordinate Ye and an estimated Ze according to the formula (5).

The processing unit is configured to compute an estimated correlated color temperature CCTe based on the estimated coordinates Xe, Ye and Ze. Finally, the processing unit is configured to change driving parameters of the light source by generating the color signal and/or the intensity signal at the control interface. Therein the generation of the color signal and/or the intensity signal depends on a comparison of the estimated correlated color temperature to a target value.

During operation in the calibration mode the received first red, green, blue, x-, y- and z-coordinates preferably originate from measurements that measure the color coordinates of light being emitted by the light source. Most preferably they originate from measurements being performed while the ambient temperature at the position of the light source is controlled to the first ambient temperature T1. Preferably, the measurements in the RGB color space are performed by an RGB sensor. Such RGB sensor may, for example, be comprised by the light source and/or the color control system or it may be an external sensor that can be coupled to the color control system and/or the light source. The coordinates received by the processing unit corresponding to measurements in the XYZ color space are preferably provided by an external device that can be coupled to the light source or the color control system. Such external device may, for example, also be capable of measuring and providing to the processing unit a correlated color temperature of light emitted by the light source. For example, such external device is implemented as a light meter.

In one embodiment of the color control system the processing unit is further configured, when operating in the productive mode, to compute a productive x-coordinate X, a productive y-coordinate Y and a productive z-coordinate Z according to the formulae (6a)-(6c) with Mx, My and Mz being scalar coefficients. Preferably the scalar coefficients are independent of the productive ambient temperature T. For example, the scalar coefficients depend on other ambient temperatures, the first coordinates, the estimated coordinates, the estimated correlated color temperature, one or more of the at least two color temperatures and/or one more of the at least two intensities.

In other embodiments of the color control system the processing unit is further configured, when operating in the calibration mode, to drive the light source at a second ambient temperature. In such embodiments the processing unit is further configured to tune the light source to emit light with a warm correlated color temperature CCTw and to receive a warm red coordinate R_w, a warm green coordinate G_w and a warm blue coordinate B_w from measurements performed in the RGB color space. Further, the processing unit is configured to receive a warm x-coordinate X_w, a warm y-coordinate Y_w and a warm z-coordinate Z_w from measurements performed in the XYZ color space. In particular the measurements correspond to light being emitted by the light source while to the light source is driven at the second ambient temperature T2. The processing unit is also configured to compute an estimated warm x-coordinate Xe_w, an estimated warm y-coordinate Yew and an estimated warm z-coordinate Ze_w according to the formula (7).

When operating in the productive mode the processing unit is further configured to generate the scalar coefficients according to the expressions (8a)-(8c). Based on the productive coordinates X, Y and Z the processing unit computes an actual correlated color temperature. The processing unit is configured to compare the actual correlated color temperature to a target value and consequently change driving parameters of the light source by generating the color signal and/or the intensity signal at the control interface depending on this comparison. Preferably the comparison and the subsequent change of driving parameters of the light source is performed alternatively to the comparison of the estimated correlated color temperature to a target value and the respective change of driving parameters.

In other embodiments of the color control system according to the improved concept, the processing unit is further configured, when operating in the calibration mode, to drive the light source at a second ambient temperature T2. The processing unit is further configured to tune the light source to emit light with a warm correlated color temperature CCTw and to receive a warm red coordinate R_w, a warm green coordinate G_w and a warm blue coordinate B_w from measurements in the RGB color space. The processing unit is also configured to receive a warm x-coordinate X_w, a warm y-coordinate Y_w and a warm z-coordinate Z_w from measurements in the XYZ color space.

Furthermore, the processing unit is configured to tune the light source to emit light with a cold correlated color temperature CCTc and to receive a cold red coordinate R_c, a cold green coordinate G_c and a cold blue coordinate B_c from measurements in the RGB color space and also a cold x-coordinate X_c, a cold y-coordinate Y_c and a cold z-coordinate Z_c from measurements in the XYZ color space. In particular the measurements correspond to light being emitted by the light source while the light source is driven at the second ambient temperature T2. The processing unit is further configured to compute an estimated warm x-coordinate Xe_w, an estimated warm y-coordinate Yew and an estimated warm z-coordinate Ze_w, an estimated cold x-coordinate Xe_c, an estimated cold y-coordinate Ye_c and an estimated cold z-coordinate Ze_c according to the formulae (7) and (9), respectively.

When operating in the productive mode the processing unit is further configured to generate the scalar coefficients according to the expressions (10a)-(10c). Based on the productive coordinates X, Y and Z the processing unit computes an actual correlated color temperature. The processing unit further compares the computed actual correlated color temperature to a target value and subsequently change driving parameters of the light source by generating the color signal and/or the intensity signal at the control interface. Preferably this comparison and the subsequent change of driving parameters are performed alternatively to the comparison of the estimated correlated color temperature with the target value and the subsequent change of driving parameters. For example the comparison and change of driving parameters is performed in order to achieve a deviation of the actual and/or estimated correlated temperature from the target value that is small enough to commonly not be noticeable by the human eye.

In some embodiments, the processing unit is configured to control the ambient temperature at the position of the light source, in particular at the position being representative for the whole light source concerning ambient temperature. In such embodiments, the processing unit is in particular configured to control the ambient temperature to the first ambient temperature by generating a first temperature signal at the control interface and to control the ambient temperature to the second ambient temperature by generating a second temperature signal at the control interface. For example the control of the ambient temperatures is performed utilizing a heating element that may or may not be comprised by the color control system and/or the light source.

In alternative embodiments, the ambient temperatures at the position of the light source are not controlled by the color control system, but are externally controlled. For controlling the ambient temperatures, for example driving currents or other driving parameters of the light source or other components in the direct or indirect environment of the light source are utilized. For example an external heating element or a cooling element is used. Alternatively a controllable heat sink or current sink may be used or the room temperature may be controlled. For example one or more heat sinks on which the light source or a part of the light source is mounted may be heated, for example utilizing resistor blocks. For example one or more thermal probes to measure temperatures may be placed near the light source or a part of the light source.

In some embodiments of the color control system the target value can be modified by a user, in particular it can be modified by a user during operation of the light source. In such embodiment the user can choose the color or color temperature of the light being emitted by the light source and controlled by the color control system.

In the various embodiments of the color control system and the methods for calibrating a color space transformation and for color space transformation, the computation of the estimated color temperature and/or the actual correlated color temperature is performed based on an approach well-known in the art. Technically speaking in such approach for example the closest distance of a color point defined by Xe, Ye and Ze or X, Y and Z, respectively, to the Planckian locus is determined or estimated. The Planckian locus represents the color of an incandescent black body as a function of its temperature.

In some embodiments of the color control system the processing unit is further designed to compute color coordinates, in particular u'- and v'-coordinates u' and v', in a LUV color space on the basis of the productive coordinates X, Y and Z according to the formulae:

$$u' = \frac{4X}{X + 15Y + 3Z} \text{ and } v' = \frac{9Y}{X + 15Y + 3Z}. \quad (11)$$

In such embodiments the computation of the estimated and/or the actual correlated color temperatures can, for example, also be performed on the basis of the color coordinates in the LUV color space instead of the coordinates in the XYZ color space. For example the comparison and change of driving parameters is performed in order to achieve a deviation of the actual and/or estimated correlated temperature from the target value that is small enough to commonly not be noticeable by the human eye. A corresponding condition is for example given by the relation $$\sqrt{(u'-u_0')^2+(v'-v_0')^2} < 0.002, \quad (12)$$

wherein $u_0'$ and $v_0'$ are the u'- and v'-coordinates corresponding to the target value.

In some embodiments of the color control system an RGB sensor provides the coordinates from measurements in the RGB color space and is comprised by the color control system and/or the light source.

In some embodiments of the color control system the light source is comprised by the color control system.

In some embodiments of the color control system, the light source comprises a first light element and a second light element. In particular, the first and the second light element each comprise at least one LED. The at least one LED comprised by the first light element is, for example, designed to emit light with a correlated color temperature within a first range, in particular below 5000 K. Preferably, the at least one LED comprised by the second light element is designed to emit light with a correlated color temperatures within a second range, in particular above 3300 K.

In some embodiments the first light element emits light with a color temperature below 5000 K and the second light element emitted light with a correlated color temperature above 3300 K. In particular, the first light element may emit light below 3300 K and the second light element may emit light with a correlated color temperature above 5000 K. Further, the changing of driving parameters of the light source results in a change of relative intensities of light emitted by the first light element and the second light element.

In such embodiments the tuning of the correlated color temperature of the light source is performed by adjusting the relative intensities of the first light element, for example representing a light element emitting warm light and the light of the second element, for example representing a light element emitting cold light.

In some embodiments of the color control system, the changing of driving parameters of the light source is performed by changing a first duty cycle of a first pulse width modulation PWM, signal for driving the first light element and/or a second duty cycle of a second PWM signal for driving the second light element.

In respective embodiments of the color control system the changing of the driving parameters of the light source, in particular the changing of the first and the second duty cycle, may for example be performed utilizing a closed loop algorithm. The closed loop algorithm may for example adaptively adjust the first and the second duty cycle to achieve a wanted joint correlated color temperature and a joint intensity of the light source.

Additional methods for calibrating a color space transformation are readily derived from the steps comprised by the calibration mode of operation of the various described methods for color space transformation.

Further embodiments of the method for color space transformation result from the various embodiments of the color control system described above. In particular methods for color space transformation wherein the productive mode of operation comprises the calculation of an actual correlated color temperature, a comparison of the actual correlated color temperature to a target value and a subsequent change of driving parameters of the light source are derived from the respective embodiments of the color control system.

BRIEF DESCRIPTION OF THE DRAWINGS

In the following the improved concept is explained in detail using exemplary embodiments with reference to the drawings.

DETAILED DESCRIPTION

Figure 1:
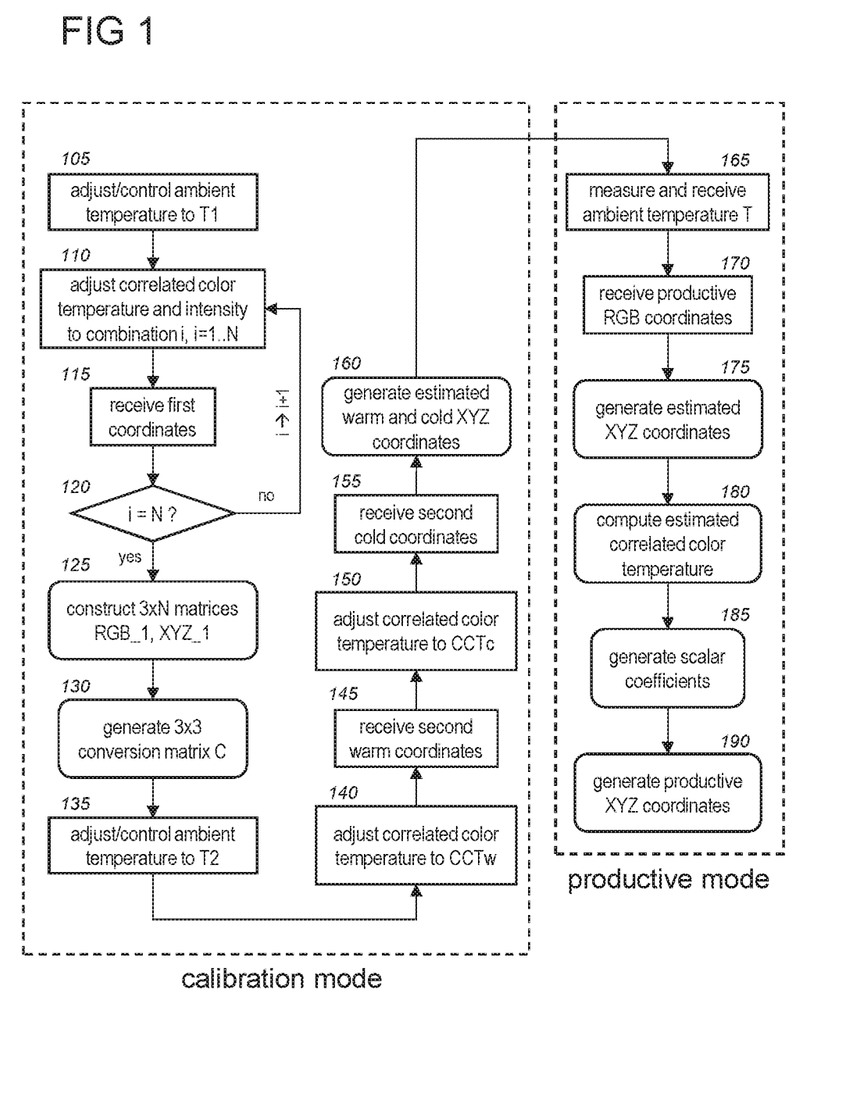
FIG. 1 shows a block diagram of an exemplary embodiment of a method for color space transformation.

In FIG. 1 a block diagram of an exemplary embodiment of a method for color space transformation is shown. The method contains a calibration mode of operation, represented by blocks 105 to 160, and a productive mode of operation, represented by the blocks 165 to 190. Beginning with block 105 a light source LS (not shown, see FIG. 3) is driven to emit light and an ambient temperature at a location of the light source LS is adjusted, in particular controlled, to a first ambient temperature T1. Then in block 110 a correlated color temperature and an intensity of the light emitted by the light source LS are adjusted to a combination i out of a total number of N combinations of at least two correlated color temperatures CCT_1, CCT_2, ..., CCT_Nc and at least two intensities I_1, I_2, ..., I_Ni, where i is equal to 1 if the block 110 is reached the first time. In the next block 115 color coordinates for the i-th combination of correlated color temperature and intensity are received. In particular, an i-th first red coordinate R_i, first green coordinate G_i, and first blue coordinate B_i are received from measurements in an RGB color space. For example, the RGB color space is the CIE 1931 RGB color space. Analogously from measurements in an XYZ color space, for example in the standard observer CIE 1931 XYZ color space, an i-th first x-coordinate X_i, first y-coordinate Y_i and first z-coordinate Z_i are received.

It is then proceeded with block 120 where it is determined whether i is equal to N. If this is not the case, i is replaced by i+1 and, recommencing from block 110, the correlated color temperature and the intensity are adjusted to the next combination i+1. If in block 120 it is determined that i is equal to N it is proceeded with block 125, wherein two 3×N matrixes RGB_1 and XYZ_1 are constructed according to the formulae (1) and (2), respectively. In block 130 based on the matrixes RGB_1 and XYZ_1 a 3×3 conversion matrix C is generated. The conversion matrix C is obtained by a method that results in a conversion matrix C fulfilling the relation (3). In some embodiments the conversion matrix C is generated according to a technique of least square optimization. That means that C is for example constructed according to the formula (4).

In the next step of block 135 the ambient temperature at the light source LS is adjusted, in particular is controlled, to a second ambient temperature T2. Subsequently in block 140 the correlated color temperature of the light emitted by the light source LS is adjusted to a warm correlated color temperature CCTw. While the light source LS is emitting light with the warm correlated color temperature CCTw, warm coordinates are received from measurements in the RBG color space, namely a warm red coordinate R_w, a warm green coordinate G_w and a warm blue coordinate B_w. Furthermore a warm x-coordinate X_w, a warm y-coordinate Y_w and a warm z-coordinate Z_w are obtained from measurements in the XYZ color space.

In block 150 the light emitted by the light source LS is adjusted to a cold correlated color temperature CCTc and in block 155 the corresponding cold second coordinates are received. That means a cold red coordinate R_c, a cold green coordinate G_c and a cold blue coordinate B_c are obtained from measurements in the RGB color space, while a cold x-coordinate X_c, a cold y-coordinate Y_c and a cold z-coordinate Z_c are obtained from measurements in the XYZ color space. Estimated warm and estimated cold coordinates are then generated based on the warm and the cold coordinates in block 160. That means an estimated warm x-coordinate Xe_w, an estimated warm y-coordinate Ye_w, an estimated warm z-coordinates Ze_w, an estimated cold x-coordinate Xe_c, an estimated cold y-coordinate Ye_c and an estimated cold z-coordinate Ze_c are constructed according to the formulae (7) and (9).

Block 160 represents the last step within the calibration mode and with block 165 the productive mode of operation begins. In block 165 the light source is driven at a productive ambient temperature T, wherein the ambient temperature T is not necessarily controlled, but depends on the requirements of and/or the conditions in the application. The productive ambient temperature T is then for example measured and received. In block 170 a productive red coordinate R, a productive green coordinate G and a productive blue coordinate B are obtained from measurements in the RGB color space. Based on the productive red, blue and green coordinates an estimated x-coordinate Xe, an estimated y-coordinate Ye and an estimated z-coordinate Ze are generated according to the formula (5) in block 175.

Then in block 180 an estimated correlated color temperature CCTe is computed on the basis of the estimated coordinates Xe, Ye and Ze. The calculation of the estimated color temperature CCTe is performed based on a well-known approach estimating the closest distance of a color point given by Xe, Ye and Ze to the Planckian locus. Based on the various x-, y- and z-coordinates, the first and second ambient temperatures and the cold, warm and estimated correlated color temperatures, the scalar coefficients Mx, My and Mz are generated according to the expressions (10a)-(10c) in block 185. Finally, in block 190 a productive x-coordinate X, a productive y-coordinate Y and a productive z-coordinate Z are generated according to the formulae (6a)-(6c).

In the embodiment of the method for color space transformation described above the scalar coefficients Mx, My and Mz depend on the first and the second ambient temperatures T1 and T2 as well as on the cold, the warm and the estimated correlated color temperatures CCTc, CCTw and CCTe, see equations (10a)-(10c). Furthermore, they serve as coefficients multiplying a linear function of the productive ambient temperature T, see equations (6a)-(6c). These scalar coefficients correspond to an embodiment of the method with the biggest computational effort and also the most accurate generation of the productive coordinates X, Y and Z described in the present document.

However, there may be applications where the dependence of the transformation from RGB color space to XYZ color space on the correlated color temperatures can be neglected. Then scalar coefficients Mx, My, Mz may be calculated according to the simpler formulae (8a)-(8c). Mathematically this corresponds to assuming in equations (10a)-(10c) that the estimated color temperature CCTe is equal to the warm correlated color temperature CCTw. In corresponding embodiments of methods for color space transformation, blocks 150 and 155 as well as the generation of the estimated cold coordinates in block 160 are optional.

Again for other applications or situations also a dependence on the ambient temperature might be negligible. In corresponding embodiments the method for color space transformation ends for example with the calculation of the estimated Xe, Ye, Ze in block 175. In other words the productive x-, y- and z-coordinates correspond to the estimated x-, y- and z-coordinates, or mathematically speaking the scalar coefficients Mx, My and Mz are all set to zero in equations (6a)-(6c). In such embodiments, the blocks 135 to 160 as well as the blocks 180 to 190 are optional.

In the embodiment of the method for color space transformation described above, the warm correlated color temperature CCTw corresponds, for example, to light that is commonly denoted as warm light, in particular warm white light. A common definition for warm light is, for example, light featuring a correlated color temperature below 3300 K. On the other hand, the cold correlated color temperature CCTc, for example, corresponds to light commonly denoted as cold light, in particular cold white light. A common definition for cold light is, for example, light with a correlated color temperature beyond 5000 K. Commonly light with a correlated color temperature between 3300 K and 5000 K is, for example, denoted as neutral light, in particular neutral white light. However, such assignment of concrete values to the warm and the cold correlated color temperatures CCTw and CCTc is in no way necessary for the methods described herein. In particular, all methods described herein work in the same way whether the value of CCTw is smaller than the value of CCTc or the other way around.

In some embodiments the at least two correlated color temperatures CCT_1, CCT_2, . . . , CCT_Nc are, for convenience of nomenclature only, ordered in ascending order. In this case CCT_1 would have the lowest value corresponding to the warmest light and CCT_Nc had the largest value corresponding to the coldest light. However, also this is no way a requirement for the methods described. In some embodiments the warm correlated color temperature CCTw lies within the range spanned by the at least two correlated color temperatures, in some embodiments CCTw is equal to CCT1. In some embodiments also CCTc lies within the range spanned by the at least two correlated color temperatures, in some embodiments CCTc is equal to CCT_Nc.

The intensity of the light being emitted during the productive mode of operation is not further specified. In particular it may or may not lie within the range spanned by the at least two intensities. However, the most accurate results for the transformation from RGB color space to XYZ color space is to be expected if the intensity of the light emitted during the productive operation lies in the range spanned by the at least two intensities.

The calibration mode and the productive mode of the various implementations and embodiments are not necessarily linked in the sense that they do not necessarily have to be performed one after the other. In particular, the calibration mode, corresponding to blocks 105 to 160 in FIG. 1, may for example be performed once and the productive mode, corresponding to blocks 165 to 190 in FIG. 1, may be executed periodically during operation of the color control system.

Figure 2:
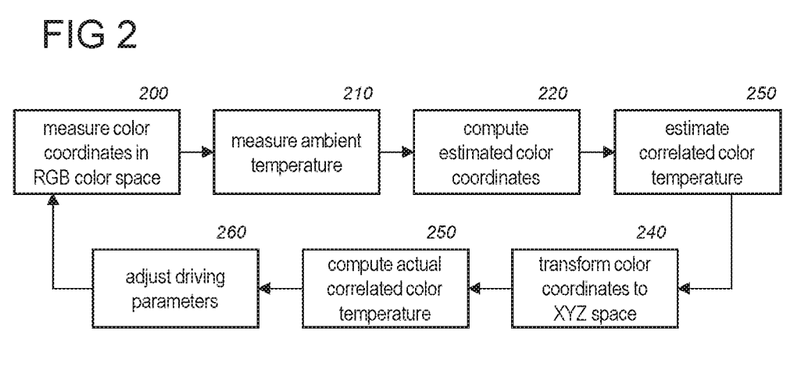
FIG. 2 shows a block diagram of an example of a control loop utilizing an embodiment of a method for color space transformation.

FIG. 2 shows an example of a control loop utilizing an exemplary embodiment of a method for color space transformation according to the improved concept. In block 200 productive red, green and blue coordinates R, G, B are measured in the RGB color space. Furthermore, the productive ambient temperature T is measured or received in block 210. Then, in block 220 the estimated x-, y- and z-coordinates Xe, Ye and Ze are calculated, utilizing equation (5). Based on the estimated x-, y- and z-coordinates Xe, Ye and Ze the estimated correlated color temperature CCTe is computed in block 230. Subsequently, in block 240 the productive red, green and blue coordinates are transformed to the XYZ color space making use of formula (6) and the scalar coefficients being calculated either with equations (8a)-(8c) or with equations (10a)-(10c). Based on the productive x-, y- and z-coordinates X, Y and Z, then an actual correlated color temperature is computed in block 250. In block 260 driving parameters of the light source are adjusted depending on a comparison of the actual correlated color temperature with a target value. Further measurements in the RGB color space of productive red, green and blue color coordinates R, G and B close the control loop.

For such control loop, the steps of the calibration mode of operation of one embodiment of the method for color space transformation are performed at least once in order to be able to perform a transformation of productive color coordinates R, G, B in the RGB color space to productive color coordinates X, Y, Z in the XYZ color space in block 240. In particular the conversion matrix C and the estimated warm and cold x-, y- and z-coordinates are generated upfront. As pointed out above, in some embodiments of the method the productive coordinates X, Y, Z can be identical to the estimated coordinates Xe, Ye, Ze within the transformation of block 240.

Figure 3:
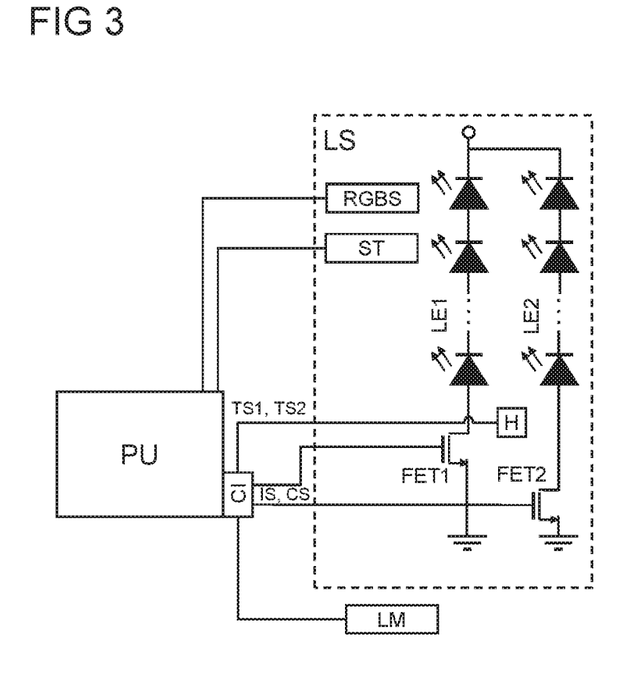
FIG. 3 sketches an exemplary embodiment of a color control system coupled to a light source.

In FIG. 3 an exemplary embodiment of a color control system coupled to a light source LS is shown. The color control system comprises a processing unit PU that is coupled to the light source LS. In the embodiment of the color control system shown in FIG. 3, the light source LS is comprised by the color control system. However, in alternative embodiments the light source may not be part of the color control system. The light source LS comprises an RGB sensor RGBS and a temperature sensor ST that are both coupled to the color control system. Optionally the light source comprises a heater H that is coupled to the color control system via a control interface CI of the processing unit PU. In the embodiment of FIG. 3 the coupling of the RGB sensor RGBS and the temperature sensor ST to the color control system is not via the control interface CI. In alternative embodiments the RGB sensor RGBS and/or the temperature sensor ST may be coupled to the control interface CI.

In FIG. 3 the heater H is depicted to be placed in between the first light element LE1 and the second light element LE2. This is for visualization purposes only. In particular the heater H may represent one or more heat sinks on which the light source LS or the first light element LE1 and/or the second light element LE2 are mounted. The heater H may for example be heated utilizing resistor blocks. The temperature sensor ST may for example represent one or more thermal probes. In particular the thermal probes may be placed near the first light element LE1 and/or the second light element LE2.

The light source comprises a first light element LE1 and a second light element LE2. The first light element LE1 comprises, for example at least one LED, preferably at least one LED designed to emit warm white light, while the second light-emitting element LE2 comprises at least one light-emitting diode, preferably at least one light-emitting diode designed to emit cold white light. A common definition for warm white light is for example light with a correlated color temperature below 3300 K, while a common definition for cold white light is for example light with a correlated color temperature of above 5000 K. In the shown embodiment the at least one LED comprised by the first light element LE1 is designed to emit light with a correlated color temperature below 5000 K, preferably below 3300 K, while the at least one LED comprised by the second light element LE2 is designed to emit light with a correlated color temperature of beyond 3300 K, preferably beyond 5000 K.

Coupled in series to the first light element LE1 there is a first PWM unit FET1, in particular being designed as a field effect transistor. Coupled in series with the second light element LE2 is a second PWM unit FET2, in particular designed as a field effect transistor. The first and the second PWM units are further coupled to the control interface CI of the color control system. Finally, FIG. 3 shows a light meter LM that is coupled to the control interface CI and in the shown embodiment is not comprised by the color control system. In some embodiments the light meter LM can be decoupled from the processing unit PU.

The processing unit PU is configured to be operated in a calibration mode and in a productive mode of operation. When operating in the calibration mode it is further configured to control the correlated color temperature of light emitted by the light source LS by generating a color signal CS at the control interface CI. It is also configured to control the intensity of light emitted by the light source LS by generating an intensity signal IS at the control interface CI. The processing unit PU is further configured to receive the ambient temperature at the position of the light source LS and to drive the light source LS at a first ambient temperature T1. In embodiments wherein the light source LS comprises the heater H, the processing unit PU is configured to control the ambient temperature at the position of the light source to the first ambient temperature T1 by generating a first temperature signal TS1 at the control interface CI. In such embodiment the control of the ambient temperature is performed by the heater H and the temperature sensor ST. In the shown embodiment the light elements LE1 and LE2 both emit light. The resulting joint light features a joint correlated color temperature and a joint intensity.

The joint correlated color temperature and the joint intensity are adjusted to a number of N combinations of at least two correlated color temperatures CCT_1, CCT_2, . . . , CCT_Nc and at least two intensities I_1, I_2, . . . , I_Ni. Herein Nc and Ni denote the total numbers of correlated color temperatures and intensities used, respectively. For each combination of correlated color temperature and intensity the RGB sensor RGBS performs measurements of color coordinates in the RGB color space. In this way first red coordinates R_1, R_2, . . . , R_N, first green coordinates G_1, G_2, . . . G_N and first blue coordinates B_1, B_2, . . . , B_N are provided to the processing unit PU. Analogously the light meter LM performs measurements of color coordinates in the XYZ color space for each combination of correlated color temperature and intensity. In this way first x-coordinates X_1, X_2, . . . , X_N, first y-coordinates Y_1, Y_2, . . . , Y_N and first z-coordinates Z_1, Z_2, . . . , Z_N are provided to the processing unit PU.

In the shown embodiment the at least two correlated color temperatures and the at least two intensities are controlled by the color control system via the first and the second PWM units FET1 and FET2. In particular the color control system provides a first PWM signal featuring a first duty cycle to the first PWM unit FET1, and a second PWM signal featuring a second duty cycle to the second PWM unit FET2. By changing the first and the second duty cycle the intensities, in particular the relative intensities of light being emitted by the first light element LE1 and the second light element LE2 can be changed. The joint intensity and the joint correlated color temperature depend on the relative intensities of light emitted by the first light-emitting LE1 and light emitted by the second light element LE2 and their individual intensities, respectively.

Based on the generated first red, green and blue coordinates from the measurements in the RGB color space the processing unit PU generates a 3×N matrix RBG_1 based on the formula (1). In the same way the processing unit PU constructs, based on the received x-, y- and z-coordinates from the measurements in the XYZ color space, the 3×N matrix XYZ_1 according to the formula (2). The processing unit PU is configured to generate, based on these two 3×N matrices, the 3×3 conversion matrix C by using a least square algorithm making use of the formula (4). Alternatively another algorithm may be used, provided the conversion matric C fulfils the relation (3).

For example, steps necessary to generate the conversion matrix C may be carried out during or after manufacturing or testing the color control system. The steps described in the following may for example be carried out by a user of the color control system.

The processing unit PU drives the light source LS at a second ambient temperature T2. In embodiments wherein the light source LS comprises the heater H, the processing unit PU is configured to control the ambient temperature at the position of the light source to the second ambient temperature T2 by generating a second temperature signal TS2 at the control interface CI. Utilizing the light meter LM and the first and the second PWM units FET1 and FET2 the processing unit PU adjusts the light emitted by the light source to a warm correlated color temperature CCTw. Then, the RGB sensor RGBS performs further measurements in the RGB color space to provide a warm red coordinate R_w, a warm green coordinate G_w and a warm blue coordinate B_w to the processing unit PU. Analogously the light meter LM performs further measurements in the XYZ color space to provide a warm x-coordinate X_w, a warm y-coordinate Y_w and a warm z-coordinate Z_w to the processing unit PU. The processing unit PU is configured to compute then an estimated warm x-coordinate Xe_w, an estimated warm y-coordinate Ye_w and an estimated warm z-coordinate Ze_w according to the formula (7).

Still in the calibration mode of operation the processing unit PU adjusts the correlated color temperature of light emitted by the light source to a cold correlated color temperature CCTc. Therefore, again the light meter is used together with the first and the second PWM units FET1 and FET2. The RGB sensor RGBS performs another measurement in the RGB color space providing a cold red coordinate R_c, a cold green coordinate G_c and a cold blue coordinate B_c while the light meter LM performs measurements in the XYZ color space to provide a cold x-coordinate X_c, a cold y-coordinate Y_c and a cold z-coordinate Z_c to the processing unit PU. As for the warm coordinates the processing unit PU computes an estimated cold x-coordinate Xe_c, an estimated cold y-coordinate Ye_c and an estimated cold z-coordinate Ze_c according to the formula (9).

When operating in the productive mode the light source LS emits light while the ambient temperature at the light source corresponds to a productive ambient temperature T. The productive ambient temperature T is provided to the processing unit PU by the temperature sensor ST. The RGB sensor RGBS performs further measurements in the RGB color space providing a productive red coordinate R, a productive green coordinate G and a productive blue coordinate B to the processing unit PU. The processing unit PU then computes an estimated x-coordinate Xe, an estimated y-coordinate Ye and an estimated z-coordinate Ze according to the formula (5).

Furthermore, the processing unit PU computes an estimated correlated color temperature CCTe based on the estimated coordinates Xe, Ye and Ze. The calculation of the estimated color temperature CCTe is performed based on a well-known approach estimating the closest distance of a color point given by Xe, Ye and Ze to the Planckian locus. The scalar coefficients Mx, My and Mz are then generated according to the expressions (8a)-(8c) or, preferably, according to the expressions (10a)-(10c). Based on the estimated x-, y- and z-coordinates Xe, Ye and Ze, as well as on the scalar coefficients Mx, My and Mz, a productive x-coordinate X, a productive y-coordinate Y and a productive z-coordinate Z are computed according to the formulae (6a)-(6c).

Furthermore, an actual correlated color temperature is computed based on the productive x-, y- and z-coordinates X, Y and Z. The calculation of the actual color temperature CCTe is performed based on a well-known approach estimating the closest distance of a color point given by X, Y and Z to the Planckian locus. The processing unit PU compares the actual correlated color temperature to a target value. Depending on the result of the comparison, the processing unit PU changes driving parameters of the light source LS by generating the color signal CS and/or the intensity signal IS at the control interface CI. In the shown embodiment the driving parameters are changed by changing the first duty cycle of the first PWM unit and the second duty cycle of the second PWM unit. Alternatively or in addition, the driving current of the first and the second light element LE1, LE2 can be adjusted to tune respective intensities and/or correlated color temperatures.

The target value can, for example, be stored in the processing unit PU or the light source LS. Preferably the target value can be changed by a user for example during operation of the light source LS.

The number of light elements comprised by the light source LS is not restricted to two. In particular only one light element or more than two light elements may be used. For example, alternative implementations may utilize three light elements. Then the control system may for example be similar to the one shown in FIG. 3, additionally comprising a third light element and a corresponding third PWM unit. By additionally changing a third duty cycle of the third PWM unit and/or changing a driving current of the third light element, the joint intensity and/or the joint correlated color temperature of the light source LS may be adjusted.

Since the light meter LM is preferably used only during the calibration mode, in some embodiments the light meter LM is decoupled from the processing unit PU during the productive mode.

For recalibration purposes the color control system may be operated in calibration mode again after operating in productive mode. Then the steps of the calibration mode of a method for color space transformation are repeated or partly repeated. For example the recalibration is triggered manually by a user. Alternatively the recalibration is triggered by the processing unit PU automatically. In embodiments wherein the recalibration is triggered automatically the processing unit PU for example calculates a deviation based on the comparison of the actual correlated color temperature with the estimated correlated color temperature. When the deviation is larger than a threshold, the processing unit PU for example triggers the recalibration. Also other conditions for triggering the recalibration, including deviations of the ambient temperature and/or the intensity from corresponding thresholds, may be used.

The various embodiments of methods for calibrating a color space transformation and for color space transformation and of color control systems provide suitable prospects for accurate color space transformation and color control, especially involving different temperatures, intensities and correlated color temperatures. Furthermore, the various embodiments of the methods for calibrating a color space transformation, the methods for color space transformation as well as the various embodiments for the color control system may be combined or split in order to be adapted for specific applications.

The invention claimed is:

1. A color control system comprising a processing unit which is coupled to a light source via a control interface, wherein the processing unit, when operating in a calibration mode, performs the steps of:

controlling a correlated color temperature of light emitted by the light source by generating a color signal at the control interface;

controlling an intensity of light emitted by the light source by generating an intensity signal at the control interface;

controlling an ambient temperature at a position of the light source to a first ambient temperature T1 by generating a first temperature signal at the control interface;

receiving first red coordinates $R\_1, R\_2, \ldots, R_{13}N$, first green coordinates $G\_1, G\_2, \ldots, G\_N$ and first blue coordinates $B\_1, B\_2, \ldots, B\_N$ from measurements in an RGB color space and first x-coordinates $X\_1, X\_2, \ldots, X\_N$, first y-coordinates $Y\_1, Y\_2, \ldots, Y\_N$ and first z-coordinates $Z\_1, Z\_2, \ldots, Z\_N$ from measurements in an XYZ color space, corresponding to a number N of combinations of at least two correlated color temperatures $CCT\_1, CCT\_2, \ldots, CCT\_Nc$, Nc denoting the total number of correlated color temperatures, and at least two intensities $I\_1, I\_2, \ldots, I\_Ni$, Ni denoting the total number of intensities;

generating a 3×N matrix RBG_1 from the received coordinates measured in the RGB color space according to the formula $$RGB\_1 = \begin{bmatrix} R\_1 & R\_2 & \ldots & R\_N \\ G\_1 & G\_2 & \ldots & G\_N \\ B\_1 & B\_2 & \ldots & B\_N \end{bmatrix};$$

generating a 3×N matrix XYZ_1 from the received coordinates measured in the XYZ color space according to the formula $$XYZ\_1 = \begin{bmatrix} X\_1 & X\_2 & \ldots & X\_N \\ Y\_1 & Y\_2 & \ldots & Y\_N \\ Z\_1 & Z\_2 & \ldots & Z\_N \end{bmatrix};$$

and generating a 3×3 conversion matrix C fulfilling the relation $XYZ\_1 = C*RGB\_1$;

and; when operating in a productive mode, the processing unit performs the steps of:

receiving an additional red coordinate R, an additional green coordinate G and an additional blue coordinate B from measurements in the RGB color space performed at an additional ambient temperature T;

computing an estimated x-coordinate Xe, an estimated y-coordinate Ye and an estimated z-coordinate Ze according to the formula $$\begin{bmatrix} Xe \\ Ye \\ Ze \end{bmatrix} = C * \begin{bmatrix} R \\ G \\ B \end{bmatrix};$$

computing an estimated correlated color temperature CCTe based on Xe, Ye and Ze; and changing driving parameters of the light source by generating at least one of the color signal or the intensity signal at the control interface depending on a comparison of the estimated correlated color temperature to a target value.

2. The color control system according to claim 1, the processing unit when operating in the productive mode, the processing unit further computes an additional x-coordinate X, an additional y-coordinate Y and an additional z-coordinate Z according to the formulae $$X = Xe + Mx*(T-T1),$$

$$Y = Ye + My*(T-T1) \text{ and}$$

$$Z = Ze + Mz*(T-T1),$$

wherein Mx, My and Mz are scalar coefficients.

3. The color control system according to claim 2, the processing unit when operating in the calibration mode, the processing unit is able to control the ambient temperature to a second ambient temperature T2 by generating a second temperature signal at the control interface;

receive a warm red coordinate R_w, a warm green coordinate G_w and a warm blue coordinate B_w from measurements in the RGB color space and a second warm x-coordinate X_w, a warm y-coordinate Y_w and a warm z-coordinate Z_w from measurements in the XYZ color space, corresponding to a warm correlated color temperature CCTw; and compute an estimated warm x-coordinate Xe_w, an estimated warm y-coordinate Ye_w and an estimated warm z-coordinate Ze_w according to the formula $$\begin{bmatrix} Xe\_w \\ Ye\_w \\ Ze\_w \end{bmatrix} = C * \begin{bmatrix} R\_w \\ G\_w \\ B\_w \end{bmatrix};$$

and operable to, when operating in the productive mode, generate the scalar coefficients according to the expressions $$M = (X\_w - Xe\_w)/(T2-T1),$$

$$My = (Y\_w - Ye\_w)/(T2-T1) \text{ and}$$

$$Mz = (Z\_w - Ze\_w)/(T2-T1);$$

compute an actual correlated color temperature based on X, Y and Z; and change driving parameters of the light source by generating at least one of the color signal or the intensity signal at the control interface depending on a comparison of the actual correlated color temperature to the target value.

4. A color control system comprising a processing unit which is coupled to a light source via a control interface, wherein the processing unit, when operating in a calibration mode, performs the steps of:

controlling a correlated color temperature of light emitted by the light source by generating a color signal at the control interface;

controlling an intensity of light emitted by the light source by generating an intensity signal at the control interface;

controlling an ambient temperature at a position of the light source to a first ambient temperature T1 by generating a first temperature signal at the control interface;

receiving first red coordinates R_1, R_2, ..., R_N, first green coordinates G_1, G_2, ..., G_N and first blue coordinates B_1, B_2, ..., B_N from measurements in an RGB color space and first x-coordinates X_1, X_2, ..., X_N, first y-coordinates Y_1, Y_2, ..., Y_N and first z-coordinates Z_1, Z_2, ..., Z_N from measurements in an XYZ color space, corresponding to a number N of combinations of at least two correlated color temperatures CCT_1, CCT_2, ..., CCT_Nc, Nc denoting the total number of correlated color temperatures, and at least two intensities I_1, I_2, ..., I_Ni, Ni denoting the total number of intensities;

generating a 3×N matrix RBG_1 from the received coordinates measured in the RGB color space according to the formula $$RGB\_1 = \begin{bmatrix} R\_1 & R\_2 & \ldots & R\_N \\ G\_1 & G\_2 & \ldots & G\_N \\ B\_1 & B\_2 & \ldots & B\_N \end{bmatrix};$$

generating a 3×N matrix XYZ_1 from the received coordinates measured in the XYZ color space according to the formula $$XYZ\_1 = \begin{bmatrix} X\_1 & X\_2 & \ldots & X\_N \\ Y\_1 & Y\_2 & \ldots & Y\_N \\ Z\_1 & Z\_2 & \ldots & Z\_N \end{bmatrix};$$

generating a 3×3 conversion matrix C fulfilling the relation XYZ_1=C*RGB_1;

controlling the ambient temperature to a second ambient temperature T2 by generating a second temperature signal at the control interface;

receiving a warm red coordinate $R_{13}$ w, a warm green coordinate G_w and a warm blue coordinate B_w from measurements in the RGB color space and a second warm x-coordinate X_w, a warm y-coordinate Y_w and a warm z-coordinate Z_w from measurements in the XYZ color space, corresponding to a warm correlated color temperature CCTw;

receiving a cold red coordinate R_c, a cold green coordinate G_c and a cold blue coordinate B_c from measurements in the RGB color space and a second cold x-coordinate X_c, a cold y-coordinate Y_c and a cold z-coordinate Z_c from measurements in the XYZ color space, corresponding to a cold correlated color temperature CCTc; and computing an estimated warm x-coordinate Xe_w, an estimated warm y-coordinate Ye_w, an estimated warm z-coordinate Ze_w, an estimated cold x-coordinate Xe_c, an estimated cold y-coordinate Ye_c and an estimated cold z-coordinate Ze_c according to the formulae $$\begin{bmatrix} Xe\_w \\ Ye\_w \\ Ze\_w \end{bmatrix} = C * \begin{bmatrix} R\_w \\ G\_w \\ B\_w \end{bmatrix} \text{ and } \begin{bmatrix} Xe\_c \\ Ye\_c \\ Ze\_c \end{bmatrix} = C * \begin{bmatrix} R\_c \\ G\_c \\ B\_c \end{bmatrix};$$

and; when operating in a productive mode, the processing unit performs the steps of:

receiving an additional red coordinate R, an additional green coordinate G and an additional productive blue coordinate B from measurements in the RGB color space performed at an additional ambient temperature T;

computing an estimated x-coordinate Xe, an estimated y-coordinate Ye and an estimated z-coordinate Ze according to the formula $$\begin{bmatrix} Xe \\ Ye \\ Ze \end{bmatrix} = C * \begin{bmatrix} R \\ G \\ B \end{bmatrix};$$

computing an estimated correlated color temperature CCTe based on Xe, Ye and Ze;

computing an additional x-coordinate X, an additional y-coordinate Y and an additional z-coordinate Z according to the formulae $X = Xe + Mx*(T-T1)$, $Y = Ye + My*(T-T1)$ and $Z = Ze + Mz*(T-T1)$, wherein Mx, My and Mz are given by the expressions $$Mx = \frac{X\_w - Xe\_w}{T2 - T1} + \frac{X\_c - Xe\_c - X\_w + Xe\_w}{T2 - T1} \cdot \frac{CCTe - CCT\_w}{CCT\_c - CCT\_w},$$

$$My = \frac{Y\_w - Ye\_w}{T2 - T1} + \frac{Y\_c - Ye\_c - Y\_w + Ye\_w}{T2 - T1} \cdot \frac{CCTe - CCT\_w}{CCT\_c - CCT\_w},$$

$$Mz = \frac{Z\_w - Ze\_w}{T2 - T1} + \frac{Z\_c - Ze\_c - Z\_w + Ze\_w}{T2 - T1} \cdot \frac{CCTe - CCT\_w}{CCT\_c - CCT\_w};$$

computing an actual correlated color temperature based on X, Y and Z; and changing driving parameters of the light source by generating at least one of the color signal or the intensity signal at the control interface depending on a comparison of the actual correlated color temperature to a target value.

5. The color control system according to claims 1, wherein the target value is modified by a user during operation of the light source.

6. The color control system according to claim 1, wherein the processing unit is further operable to:

compute color coordinates in LUV color space u' and v' on the basis of X, Y and Z according to the formulae $$u' = \frac{4X}{X + 15Y + 3Z} \text{ and } v' = \frac{9Y}{X + 15Y + 3Z};$$

and compute at least one of the estimated correlated color temperature or the actual correlated color temperature based on u' and v'.

7. The color control system according to claim 1, further comprising least one of an RGB sensor that provides the first red coordinates R_1, R_2, ..., R_N, the first green coordinates G_1, G_2, ..., G_N and the first blue coordinates B_1, B_2, ..., B_N from the measurements in the RGB color space or the light source.

8. The color control system according to claim 1, wherein the light source comprises:

a first light element comprising at least one light emitting diode LED, designed to emit light with a correlated color temperature within a first range below 5000K; and a second light element comprising at least one LED, designed to emit light with a correlated color temperature within a second range above 3300K; and wherein the changing of driving parameters of the light source results in a change of relative intensities of light emitted by the first light element and the second light element.

9. The color control system according to claim 8, wherein the changing of driving parameters of the light source is performed by changing at least one of a first duty cycle of a first pulse width modulation, PWM, signal for driving the first light element or a second duty cycle of a second PWM signal for driving the second light element.

10. A method for calibrating a color space transformation, the method comprising:

driving, by a color control system comprising a processing unit, a light source at a first ambient temperature T1;

tuning, by the color control system, the light source to successively emit light with a number N of combinations of at least two correlated color temperatures CCT_1, CCT_2, ..., CCT_{13} Nc and at least two intensities I_1, I_2, ..., I_Ni, where Nc denotes the total number of correlated color temperatures and Ni denotes the total number of intensities used;

receiving, at the color control system, for each of the N combinations of correlated color temperature and intensity first red coordinates R_1, R_2, ..., R_N, first green coordinates G_1, G_2, ..., G_N and first blue coordinates B_1, B_2, ..., B_N from measurements in an RGB color space; and first x-coordinates X_1, X_2, ..., X_N, first y-coordinates Y_1, Y_2, ..., Y_N and first z-coordinates Z_1, Z_2, ..., Z_N from measurements in an XYZ color space;

constructing, by the color control system, a 3×N matrix RGB_1 from the received coordinates measured in the RGB color space according to the formula $$RGB\_1 = \begin{bmatrix} R\_1 & R\_2 & \ldots & R\_N \\ G\_1 & G\_2 & \ldots & G\_N \\ B\_1 & B\_2 & \ldots & B\_N \end{bmatrix};$$

constructing, by the color control system, a 3×N matrix XYZ_1 from the received coordinates measured in the XYZ color space according to the formula $$XYZ\_1 = \begin{bmatrix} X\_1 & X\_2 & \ldots & X\_N \\ Y\_1 & Y\_2 & \ldots & Y\_N \\ Z\_1 & Z\_2 & \ldots & Z\_N \end{bmatrix};$$

generating, by the color control system, a 3×3 conversion matrix C fulfilling the relation XYZ_1=C*RGB_1.

11. The method for calibrating a color space transformation according to claim 10, wherein the conversion matrix C is generated according to the least square formula $$C = XYZ\_1 * (RGB\_1)^T * (RGB\_1 * (RGB\_1)^T)^{-1}.$$

12. A method for color space transformation with a calibration mode of operation comprising a method for calibrating a color space transformation according to claim 10 and a productive mode of operation comprising:
   driving, by the color control system, the light source at an additional ambient temperature T;
   receiving, by the color control system, an additional red coordinate R, a productive green coordinate G and an additional blue coordinate B from measurements in the RGB color space;
   generating, by the color control system, an estimated x-coordinate Xe, an estimated y-coordinate Ye and an estimated z-coordinate Ze according to the formula $$\begin{bmatrix} Xe \\ Ye \\ Ze \end{bmatrix} = C * \begin{bmatrix} R \\ G \\ B \end{bmatrix}.$$

13. The method for color space transformation according to claim 12, wherein the productive mode of operation further comprises:
   generating, by the color control system, an additional x-coordinate X, a productive y-coordinate Y and an additional z-coordinate Z according to the formulae $$X = Xe + Mx * (T-T1),$$

$$Y = Ye + My * (T-T1) \text{ and}$$

$$Z = Ze + Mz * (T-T1),$$

wherein Mx, My and Mz are scalar coefficients.

14. The method for color space transformation according to claim 13, wherein
   the calibration mode of operation further comprises:
      driving, by the color control system, the light source at a second ambient temperature T2;
      tuning, by the color control system, the light source to emit light with a warm correlated color temperature CCTw;
      receiving, by the color control system, a warm red coordinate R_w, a warm green coordinate G_w and a warm blue coordinate B_w from measurements in the RGB color space;
      receiving, by the color control system, a warm x-coordinate X_w, a second warm y-coordinate Y_w and a warm z-coordinate Z_w from measurements in the XYZ color space;
      generating, by the color control system, an estimated warm x-coordinate Xe_w, an estimated warm y-coordinate Ye_w and an estimated warm z-coordinate Ze_w according to the formula $$\begin{bmatrix} Xe\_w \\ Ye\_w \\ Ze\_w \end{bmatrix} = C * \begin{bmatrix} R\_w \\ G\_w \\ B\_w \end{bmatrix};$$

and
   the productive mode of operation further comprises:
      generating, by the color control system, the scalar coefficients according to the expressions $$Mx = (X\_w - Xe\_w)/(T2-T1),$$

$$My = (Y\_w - Ye\_w)/(T2-T1) \text{ and}$$

$$Mz = (Z\_w - Ze\_w)/(T2-T1).$$

15. A method for color space transformation with a calibration mode of operation, the calibration mode comprising:
   driving, by a color control system comprising a processing unit, a light source at a first ambient temperature T1;
   tuning, by the color control system, the light source to successively emit light with a number N of combinations of at least two correlated color temperatures CCT_1, CCT_2, . . . ,CCT_Nc and at least two intensities I_1, I_2, . . . ,I_Ni, where Nc denotes the total number of correlated color temperatures and Ni denotes the total number of intensities used;
   receiving, by the color control system, for each of the N combinations of correlated color temperature and intensity
      first red coordinates R_1, R_2, . . . , R_N, first green coordinates G_1, G_2, . . . , G_N and first blue coordinates B_1, B_2, . . . , B_N from measurements in an RGB color space; and
      first x-coordinates X_1, X_2, . . . , X_N, first y-coordinates Y_1, Y_2, . . . , Y_N and first z-coordinates Z_1, Z_2, . . . , Z_N from measurements in an XYZ color space;
   constructing, by the color control system, a 3×N matrix RGB_1 from the received coordinates measured in the RGB color space according to the formula $$RGB\_1 = \begin{bmatrix} R\_1 & R\_2 & \ldots & R\_N \\ G\_1 & G\_2 & \ldots & G\_N \\ B\_1 & B\_2 & \ldots & B\_N \end{bmatrix};$$

constructing, by the color control system, a 3×N matrix XYZ_1 from the received coordinates measured in the XYZ color space according to the formula $$XYZ\_1 = \begin{bmatrix} X\_1 & X\_2 & \ldots & X\_N \\ Y\_1 & Y\_2 & \ldots & Y\_N \\ Z\_1 & Z\_2 & \ldots & Z\_N \end{bmatrix};$$

generating, by the color control system, a 3×3 conversion matrix C fulfilling the relation XYZ_1=C*RGB_1;
   driving, by the color control system, the light source at a second ambient temperature;

tuning, by the color control system, the light source to emit light with a warm correlated color temperature CCTw;

receiving, by the color control system, a warm red coordinate R_w, a warm green coordinate G_w and a warm blue coordinate B_w from measurements in the RGB color space;

receiving, by the color control system, a warm x-coordinate X_w, a second warm y-coordinate Y_w and a warm z-coordinate Z_w from measurements in the XYZ color space;

tuning, by the color control system, the light source to emit light with a cold correlated color temperature CCTc;

receiving, by the color control system, a cold red coordinate R_c, a cold green coordinate G_c and a cold blue coordinate B_c from measurements in the RGB color space;

receiving, by the color control system, a cold x-coordinate X_c, a second cold y-coordinate Y_c and a cold z-coordinate Z_c from measurements in the XYZ color space;

generating, by the color control system, an estimated warm x-coordinate Xe_w, an estimated warm y-coordinate Ye_w, an estimated warm z-coordinate Ze_w, an estimated cold x-coordinate Xe_c, an estimated cold y-coordinate Ye_c and an estimated cold z-coordinate Ze_c according to the formulae $$\begin{bmatrix} Xe\_w \\ Ye\_w \\ Ze\_w \end{bmatrix} = C * \begin{bmatrix} R\_w \\ G\_w \\ B\_w \end{bmatrix} \text{ and } \begin{bmatrix} Xe\_c \\ Ye\_c \\ Ze\_c \end{bmatrix} = C * \begin{bmatrix} R\_c \\ G\_c \\ B\_c \end{bmatrix};$$

and the productive mode of operation comprising:

driving, by the color control system, the light source at an additional ambient temperature T;

receiving, by the color control system, an additional red coordinate R, an additional green coordinate G and an additional blue coordinate B from measurements in the RGB color space;

generating, by the color control system, an estimated x-coordinate Xe, an estimated y-coordinate Ye and an estimated z-coordinate Ze according to the formula $$\begin{bmatrix} Xe \\ Ye \\ Ze \end{bmatrix} = C * \begin{bmatrix} R \\ G \\ B \end{bmatrix};$$

computing, by the color control system, an estimated correlated color temperature CCTe on the basis of Xe, Ye and Ze; and generating, by the color control system, an additional productive x-coordinate X, an additional y-coordinate Y and an additional z-coordinate Z according to the formulae $$X=Xe+Mx*(T-T1),$$

$$Y=Ye+My*(T-T1) \text{ and}$$

$$Z=Ze+Mz*(T-T1);$$

wherein Mx, My and Mz are given by the expressions $$Mx = \frac{X\_w - Xe\_w}{T2 - T1} + \frac{X\_c - Xe\_c - X\_w + Xe\_w}{T2 - T1} \frac{CCTe - CCT\_w}{CCTc - CCTw},$$

$$My = \frac{Y\_w - Ye\_w}{T2 - T1} + \frac{Y\_c - Ye\_c - Y\_w + Ye\_w}{T2 - T1} \frac{CCTe - CCTw}{CCTc - CCTw},$$

$$Mz = \frac{Z\_w - Ze\_w}{T2 - T1} + \frac{Z\_c - Ze\_c - Z\_w + Ze\_w}{T2 - T1} \frac{CCTe - CCTw}{CCTc - CCTw}.$$

16. The color control system according to claim 4, wherein the target value is modified by a user during operation of the light source.

17. The color control system according to claim 4 wherein the processing unit is further operable to:

compute color coordinates in LUV color space u' and v' on the basis of X, Y and Z according to the formulae $$u' = \frac{4X}{X + 15Y + 3Z} \text{ and } v' = \frac{9Y}{X + 15Y + 3Z};$$

and compute at least one of the estimated correlated color temperature or the actual correlated color temperature based on u' and v'.

18. The color control system according to claim 4 further comprising at least one of an RGB sensor that provides the first red coordinates R_1, R_2, . . . , R_N, the first green coordinates G_1, G_2, . . . , G_N and the first blue coordinates B_1, B_2, . . . , B_N from the measurements in the RGB color space or the light source.

19. The color control system according to claim 4 wherein the light source comprises a first light element comprising at least one light emitting diode LED, operable to emit light with a correlated color temperature within a first range below 5000K; and a second light element comprising at least one LED, operable to emit light with a correlated color temperature within a second range above 3300K; and wherein the changing of driving parameters of the light source results in a change of relative intensities of light emitted by the first light element and the second light element.

20. The color control system according to claim 19, wherein the changing of driving parameters of the light source is performed by changing at least one of a first duty cycle of a first pulse width modulation, PWM, signal for driving the first light element or a second duty cycle of a second PWM signal for driving the second light element.

21. The method for calibrating a color space transformation according to claim 12, wherein the conversion matrix C is generated according to the least square formula $$C=XYZ\_1*(RGB\_1)^T*(RGB\_1*(RGB\_1)^T)^{-1}.$$

* * * * *

UNITED STATES PATENT AND TRADEMARK OFFICE
CERTIFICATE OF CORRECTION

PATENT NO. : 10,290,264 B2
APPLICATION NO. : 15/309777
DATED : May 14, 2019
INVENTOR(S) : Sajol Christopher Ghoshal and Sina Afshari It is certified that error appears in the above-identified patent and that said Letters Patent is hereby corrected as shown below:

In the Claims

Column 18, Claim 1:
Line 31, delete "$R_{13}N$" and insert -- $R\_N$ --.

Column 20, Claim 4:
Line 57, delete "$R_{13}\ w$" and insert -- $R\_w$ --.

Column 22, Claim 10:
Line 43, delete "$CCT_{13}\ Nc$" and insert -- $CCT\_Nc$ --.

Signed and Sealed this
Twenty-fifth Day of June, 2019

Andrei Iancu
*Director of the United States Patent and Trademark Office*